United States Patent [19]

Freige et al.

[11] Patent Number: 5,006,959
[45] Date of Patent: Apr. 9, 1991

[54] COOLING OF CIRCUIT BOARDS

[75] Inventors: D. Edmond Freige, Los Altos; Richard N. Hibbs, Palo Alto, both of Calif.

[73] Assignee: Unisys Corp., Detroit, Mich.

[21] Appl. No.: 411,068

[22] Filed: Sep. 22, 1989

[51] Int. Cl.[5] .............................................. H05K 7/20
[52] U.S. Cl. ..................................... 361/384; 165/80.3; 165/126; 174/16.1; 361/415
[58] Field of Search ................. 174/15.1, 16.1; 211/41; 165/80.3, 122, 126; 361/379, 382, 383, 384, 395, 415, 390, 391; 62/414, 418

[56] References Cited

U.S. PATENT DOCUMENTS

| | | | |
|---|---|---|---|
| 3,387,648 | 6/1968 | Ward, Jr. | 174/16.1 |
| 4,702,154 | 10/1987 | Dodson | 361/384 |
| 4,728,160 | 3/1988 | Mondor | 361/384 |
| 4,758,924 | 7/1988 | Dillon | 361/383 |
| 4,821,146 | 4/1989 | Behrens | 361/383 |
| 4,901,200 | 2/1990 | Mazuro | 361/383 |

Primary Examiner—Gerald P. Tolin
Attorney, Agent, or Firm—John J. McCormack; Mark T. Starr

[57] ABSTRACT

Embodiments disclose modular elements of a control system wherein units are arranged in a single integrated array, with plug-in units packaged in like modules, and cooled in common, along with a motherboard.

13 Claims, 12 Drawing Sheets

COOLING OF CIRCUIT BOARDS

This invention relates to control equipment; and more particularly to cooling arrangements therefor.

BACKGROUND; FEATURES

Workers in the art of making and using control equipment realize that one must emphasize simple design and ease of manufacture, particularly for popular, general-use equipment. An object of this invention is to provide a control arrangement having a simplified layout, with component units that are unitary and readily integrated.

One must take care to design parts that are self-protected from abusive or dangerous handling; e.g., when a user removes and stores a unit, he might mechanically damage it. One factor in this, and a noteworthy object hereof is to avoid this by packaging all such items in essentially identical protective plastic envelopes.

But when such items are so confined in a protective enclosure, heat dissipation can become a problem, especially when component-density is high. Thus, a related object is to so package items, while making the packages readily-coolable; cf. introducing inlet/outlet means for coolant-air which is directed to flow across the enclosed circuit board; while also making the package apt for air-tight, plug-in mounting on a base.

A further object is to so package and so mount the items on a base, while also directing the coolant-air therefrom to wash-across a motherboard within the base. A further object is to metallize such plastic package structure to block entry/exit of electromagnetic radiation. Another object is to bevel the top edge of each such card-package to make it easier to handle and more open to air-entry.

Workers may also recognize that the organization of control assemblies is all too apt to be complicated, making assembly and part-replacement rather complex and time-consuming. Thus, another object hereof is to segregate functional units like a disk array, the so-packaged cards, a power/fan unit and a motherboard locus, making these relatively independent, self-contained, modular and easily joined together, quickly and easily, without special skill or tools. More particularly, an object is to make such units easy to mount-upon, and plug-into, a motherboard-enclosing base. A related object is to make such a base also function as an air-coolant plenum.

A further object is to provide a snap-on cover for such an array of on-base mounted units, one that still allows the user to pick-up the array by its cover. A related object is to provide such a cover in cooperation with a disable-switch arranged to disable system power when the cover is removed.

Another object is to address at least some of the foregoing concerns and teach ways of ameliorating them.

BRIEF DESCRIPTION OF DRAWINGS

These and other features and advantages of the present invention will be appreciated by workers as they become better understood by reference to the following detailed description of the present preferred embodiments; these should be considered in conjunction with the accompanying drawings, wherein:

FIG. 2 shows these in side-view, while

FIG. 6 is a rear elevation of the control unit, while

FIG. 9 is a side-rear perspective view of the control unit with disk drives and card-packages removed; while

The invention will be better appreciated by workers upon consideration of the following detailed description of preferred embodiments.

DESCRIPTION OF PREFERRED EMBODIMENTS

General description, background

The means discussed herein will generally be understood as selected, formulated, and operating as presently known in the art, except where otherwise specified. And, except as otherwise specified, all materials, methods, and devices and apparatus herein will be understood as implemented by known expedients according to present good practice.

Figure 1:
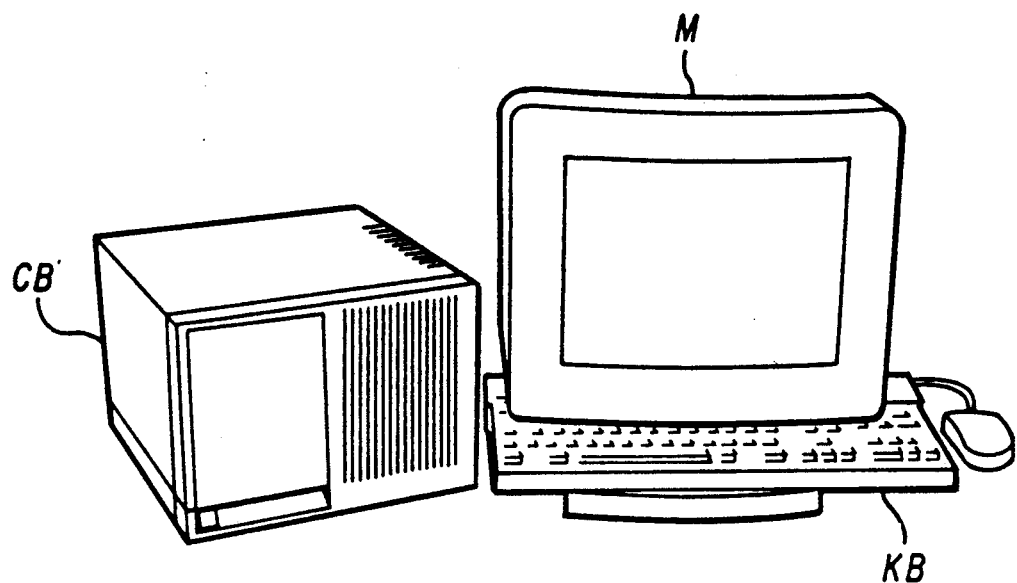
FIG. 1 is a front perspective view of an embodiment control unit with associated monitor M and keyboard KB.
Figure 2:
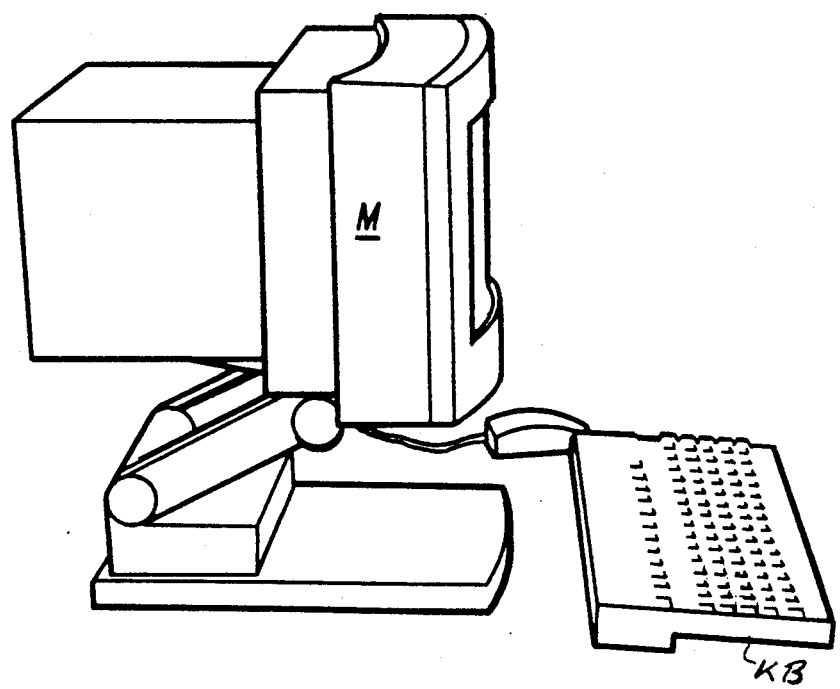

As seen in FIGS. 1, 2 for instance, our preferred embodiment is part of a desktop computer array including a control unit CB and associated monitor M with detachable Keyboard KB. The control unit CB will be understood as comprising a base structure 7 (housing motherboard MB under deck 7-P see FIGS. 3, 8) on which are mounted a power unit 20, a disk drive array 10 and various card packages 30 plugged-onto the motherboard.

The computer is configured for a specific application by selecting the appropriate set of functional (card) modules. Functional modules can be plugged into deck 7-P of base 7 (as 30) or comprise a like Expansion Unit. Support for several SCSI and computer busses (other than the MB-Bus for motherboard) is provided; e.g. XBus, ATBus, and MicroChannel are supported. A non-MB-Bus compatibility matrix is also provided.

The computer is also modem-connectible e.g. for remote test thereof; for instance, a plant engineer may diagnose a problem remotely, by modem; and then mail a replacement part to the user.

Control Unit CB may be any convenient size (e.g. we prefer about 9" height×12"×12", at about 25 lbs.).

Preferred Architecture

The subject computer is preferably a modular 32-bit desktop computer capable of containing multiple processors.

Modularity is provided by having virtually all component aspects user-installable in small functional modules (e.g. the daughter-circuitboards inside plastic enclosures 30 functioning as modular envelopes or packages for circuit cards). Another major element so packaged is the disk array 10 (hard disk or floppy). Expansion is accommodated, to allow more functionality, by providing for add-on modules (e.g. see FIGS. 1A, 11, 12).

Five functionality modules can be plugged into the basic control unit (and/or Expansion Units), allowing for a total of ten functionality (card) modules (cf. five on base 7). Three 3½", full-height disk storage modules can be inserted into basic unit CB or into an Expansion Unit. The electronic aspects of this modular architecture allow the machine to grow from a single processor, high-performance workstation to a multiple processor, multi-tasking, high end server.

Architecture will be understood as 100% compatible with the IBM PS/2 Model 80 at the register level. Added to this architecture are a high performance cache, a closely-coupled local bus (S-Bus), a high performance backplane bus (MB-Bus) along with capability for multi-processor and shared memory/private memory. A high performance Multi-Processor Backplane Bus (MB-BUS) will accept MB-BUS modules directly, as well as XBus (expansion) modules, AT Bus cards, and MicroChannel cards through adapters.

Inside a system enclosure, i.e. the Basic Unit CB or an Expansion Unit, CPU and memory units communicate across the high speed S-Bus (a 32-bit bus running at 32 MHz, providing a maximum data rate of 32 million 32 bit "Double Words" per second, or 128 MByte/second). A Multi-Processor Backplane Bus and the MB-Bus, run between system enclosures (maximum data rate of 64 MByte/second). Cached memory on CPU modules within an enclosure is kept consistent using Modified Owned Exclusive Shared Invalid (MOESI) cache consistency protocol. Cache consistency does not expand beyond the single enclosure limit.

· Controller Unit

Figure 1A:
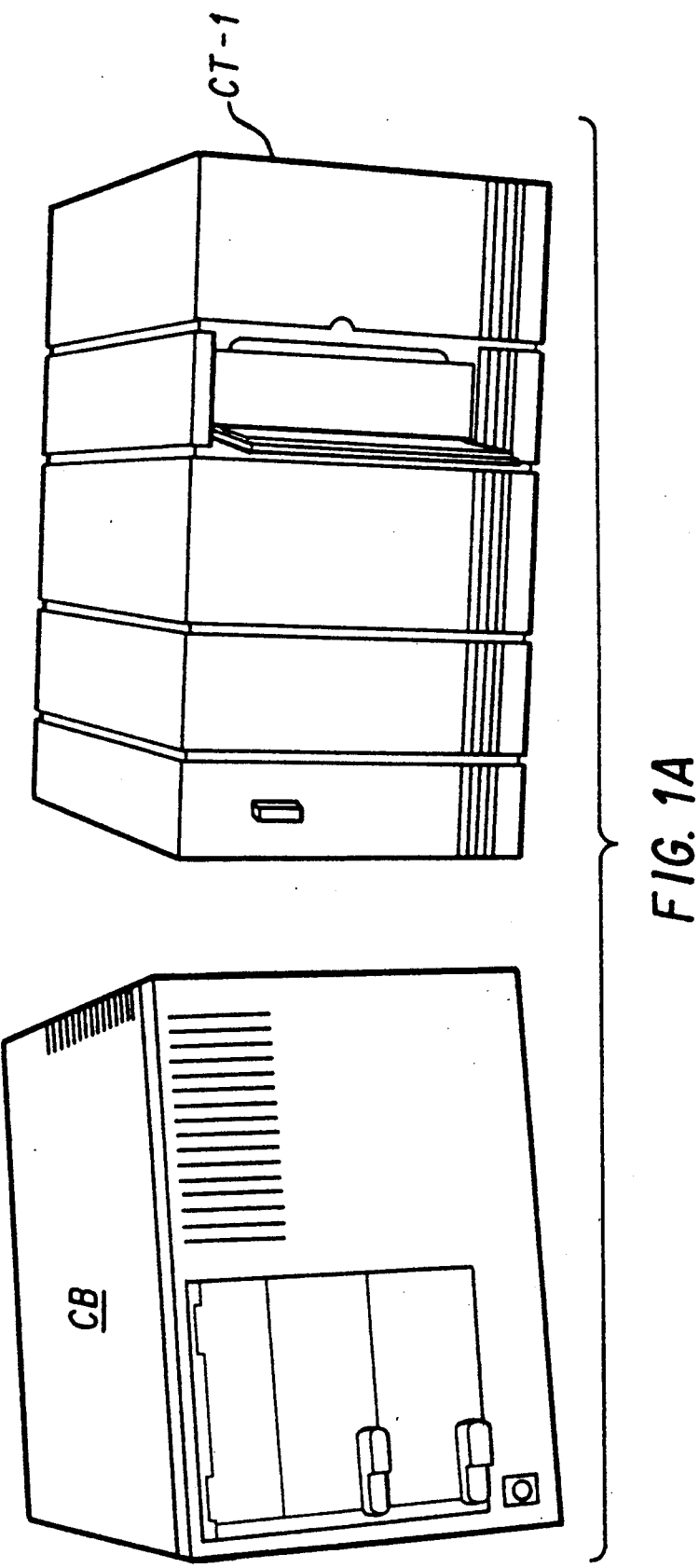
FIG. 1A shows the control unit and a related add-on module.
Figure 3:
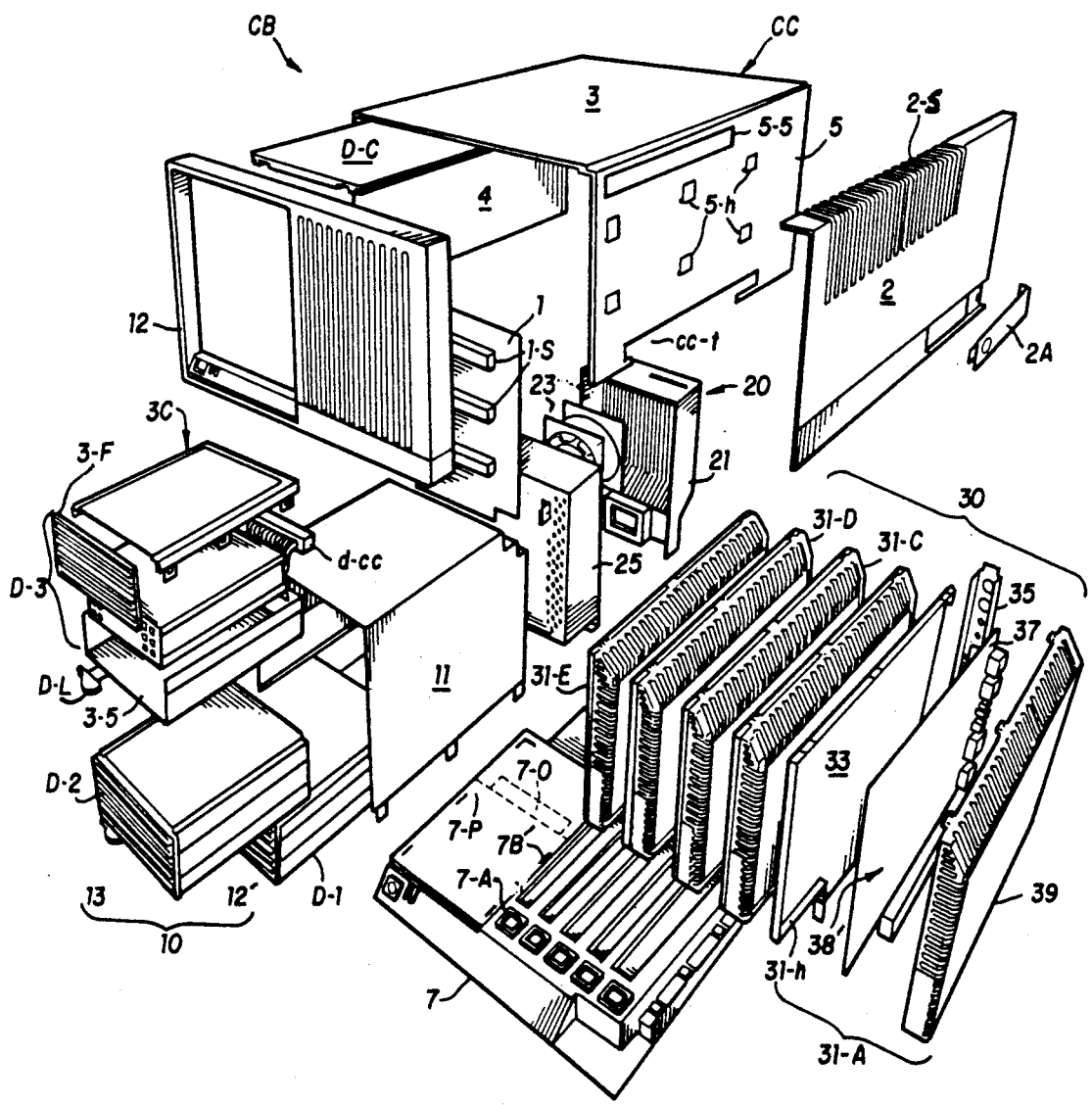
FIG. 3 is an enlarged perspective view of the control unit with parts exploded-away for clarity.
Figure 6:
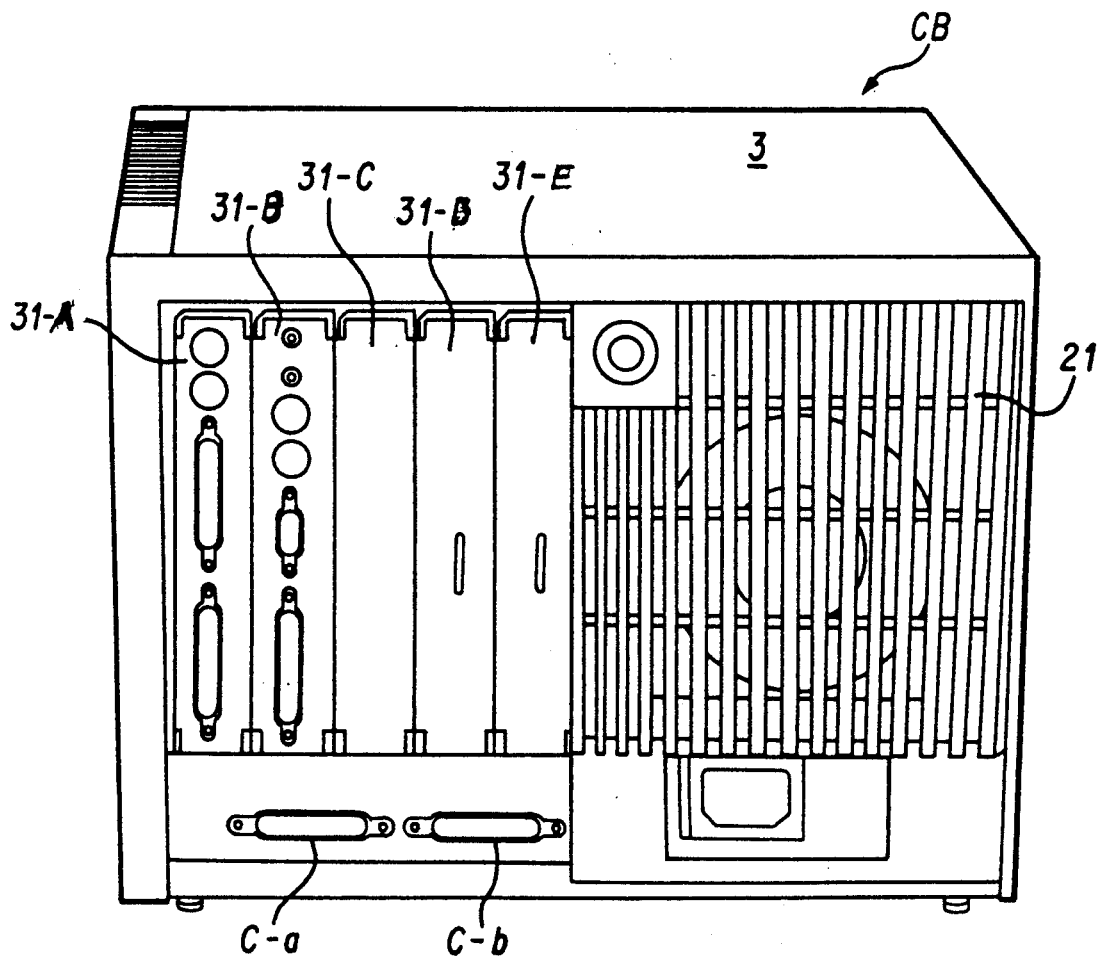

Controller unit CB is shown in schematic, front perspective view in FIGS. 1A, 3, with FIG. 6 showing the unit from the rear.

These Figures show the exterior of a U-shaped cover assembly CC (i.e., a pair of side members 4, 5 bridged by a connecting top member 3, with side member 4 not shown). Side member 5 includes air-entry 5-S and is covered by a side-panel 2. A front panel 12 is attached across the front of assembly CC. The rear of the machine is open as seen in FIG. 6.

Front panel member 12 is affixed (e.g. by sonic-weld) to the U-shaped cover CC (3, 4, 5). In fact, it is a salient feature of this control unit CB that essentially all parts (except transformer unit) are made of plastic, and are inter-connected by snaps or similar means, without use of screws or other threaded connectors—this giving a minimum of sharp edges.

As best seen in the exploded view of FIG. 3, cover assembly CC encloses interior functional units which, in turn, are connected, along with cover CC, to base member 7. Except where otherwise specified, all members are constructed of ABS or similar plastic (monitor is poly-carbonate).

More particularly, base 7 mounts, and cover assembly CC surrounds, a multi-disk-drive unit 10, a power supply unit 20 and a set 30 of insertable circuit modules 31 (5 modules shown).

Communications cables to unit CB plug onto 25-pin D-type connectors. A 25-pin female bi-directional parallel port connector and 25-pin male asynchronous "RS-232" connector are mounted on the MB-BUS backplane board. These are right-angle connectors which face the rear of base module CB. RS-485 (cluster) cables can be attached to two 8 pin mini-DIN type connectors located on the SGL-100. There are also two female 25-pin D-type connectors for connection to synchronous RS232 devices on an SGL-100 I/O panel.

Figure 7:
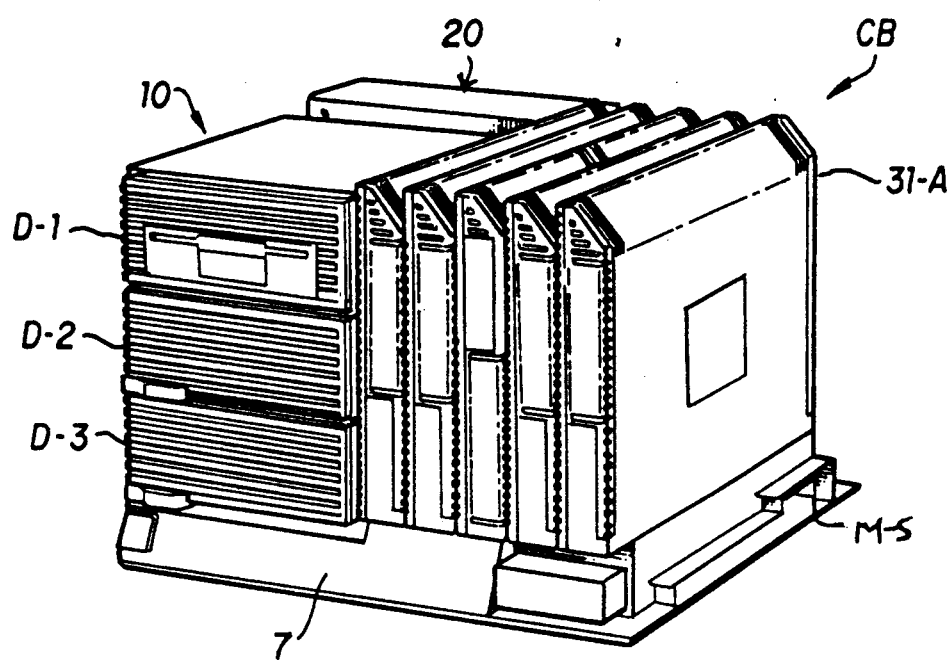
FIG. 7 is, essentially, the view as in FIGS. 4, 5 with covers removed.

Disk drive array 10 comprises a U-shaped shell 11 which is mounted, via snap-in tabs, on the surface of base 7 (e.g. see FIG. 7). Shell 11 includes tracks for slide-in mounting of three identical superposed disk drive packages, D, each including side-channel means and rear connectors, i.e. disk drive packages D-1, D-2, D-3 as known in the art (see connector card 1 having electrical receptacles 1-S and connected to receptacle on motherboard MB).

An exemplary drive package D-3 is exploded (FIG. 3) for descriptive purposes and will be seen as including a disk drive DD-3 (preferably, a 3.5" hard disk unit including lock means and electrical connectors means d-cc adapted to be mated with respective pin connector means 1-S on card 1 at the rear of shell 11, when the drive D-3 is fully inserted into its respective slot in shell 11).

Disk drive DD-3 will be seen as housed in a U-shaped vessel 3-5 (FIG. 3), being covered therein by a cap member 3C, with a facing 3-F coupled at the front to 3C and 3-5 (all members being made of plastic and snap-fit together as known in the art). Workers will appreciate that each drive D-1, D-2, D-3, will be arranged and adapted to fit snugly into its zone within shell 11, e.g. each respective vessel 3-5 being provided with lateral grooves on its two outer sides, these adapted to interfit slidingly with respective projecting side-rails along the inside of shell 11 as known in the art.

Enclosure CC (3, 4, 5, 12) has "key lock" means so that, in the locked position, the enclosure can not be removed, thus preventing functional modules from being inserted or removed ("unlock" to remove). The system will operate with the key in either the locked or unlocked position.

The disk drive modules can be removed by the customer from the "Storage Module Bay" without opening the enclosure, when power is off. The drive modules have a handle to pull the modules from their Storage Bay (covered by door or cover D.C.).

Figure 5:
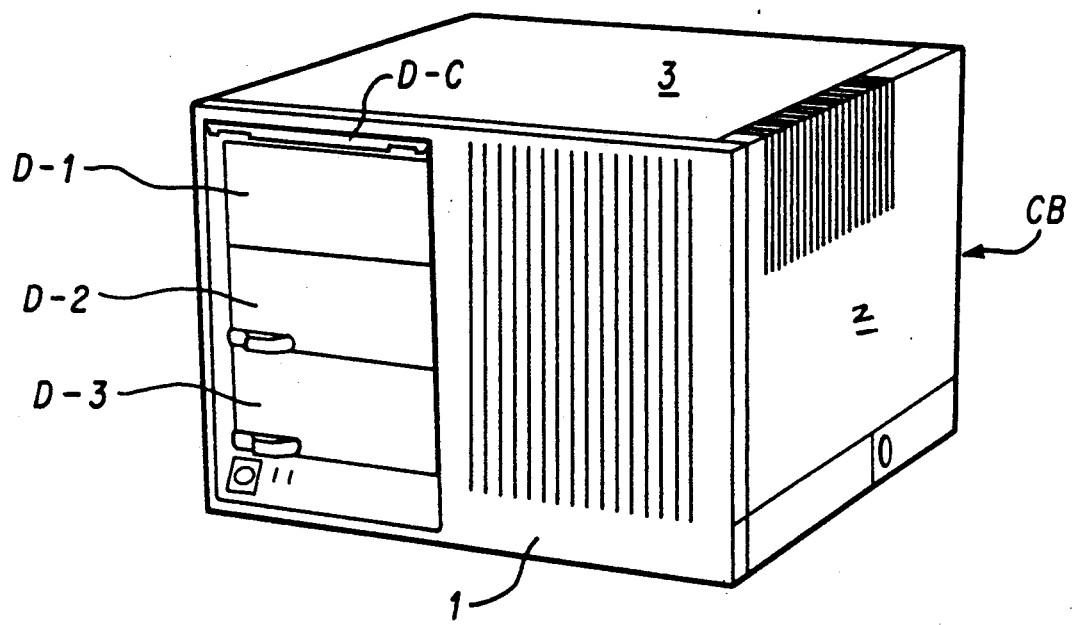

As workers realize, each drive (D-1, etc.) is to be manually inserted and extracted from its respective position in shell 11. To facilitate this, a drive-lock assembly (and handle D-L is provided along the base of each vessel 3-5, being adapted to be thrown from a central, "Locked" position, (as with D-3, D2 FIG. 5), to a lateral "Unlocked" position (as with D-3) in FIG. 3) when the unit is to be removed. The locking action will be understood as acting to engage/disengage connectors d-cc from respective pins in 1-S as shown in the art—as well as providing a somewhat central grip for a user when extracting the drive. The "locking action" is invoked to pull-in a drive the last fractional-inch; i.e. after insertion of the drive almost "fully-into" shell 11, displacing handle D-L from its "open" (side) position to its "closed" (center) position will automatically further-insert connector d-cc and the entire unit back against mating pins (1-S) and provide for firmer mechanical/electric connection as known in the art.

The disk drives may comprise any compatible units; e.g. three identical module 3.5" full-height disk drives so enclosed in plastic—these being SCSI-compatible with self-contained controllers and data separators (e.g., 19 msec access time; formatted capacity of 40, 80, 140 Mbytes).

A SCSI bus activity indicator LED (C-1, FIG. 4) is preferably provided to be visible at the front of Controller CB even when access-door D-C is closed.

Behind disk drive array 10 (FIG. 3) and mounted on motherboard MB, beneath platform 7-P, is the Power assembly 20 including a transformer unit, surrounded by a cage 25. Behind the transformer unit is a fan unit 23, and behind the fan is a perforated plastic exhaust-screen 21 (seen in FIGS. 3, 6). Power unit 20 is electrically connectible with "house power"; it will typically provide about 200 watts and operate safely up to about 18° C. above ambient. Unit 20 feeds power to disk array 10 and motherboard MB. As indicated in FIG. 3, platform 7-P is disposed operatively adjacent, Power unit 20. This gives access to under-portions, allowing fan 23 to pull air from within base 7 across motherboard MB (from right to left) and expel it outwardly through the slots in screen 21.

Figure 8:
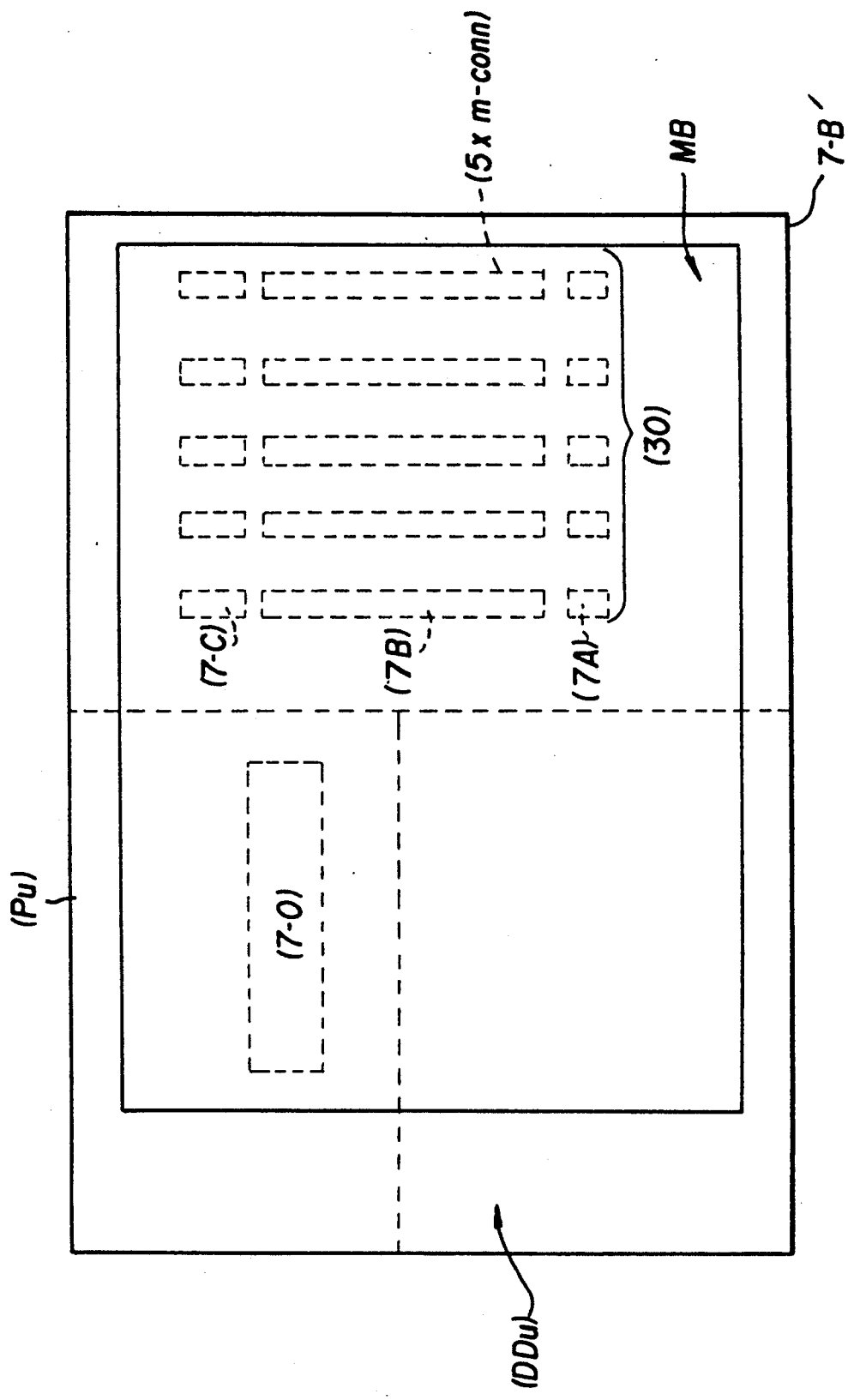
FIG. 8 is a top plan schematic view of the Base portion of the control unit.

Thus, consider FIG. 8, a sectional plan view of base 7 below deck 7-P, schematically depicting motherboard MB set on the bottom 7-B' of Base 7 and adapted for engagement with manually-inserted "daughter-circuit" envelopes 31 (five connectors 7B shown in phantom). Coolant-air will be assumed as drawn into each card 31, thence down onto motherboard MB via ports 7A, 7C, and across MB to exit toward fan 23 and out through screen 21.

Thus, each such card module 31 includes a base tang 38 (FIG. 9) flanked by a pair of air-vent holes (e.g. at 31-h, FIG. 10) adapted to interfit, air-tight, with receiving holes 7A, 7C in deck 7-P to feed coolant-air into the plenum space over the motherboard MB. The tang portions fit into receiving holes 7B' so as to engage electrical contacts on the subjacent motherboard MB in known mother/daughter fashion.

Each such controller unit CB (or Expansion Unit) has its own power supply. These AC-input supplies provide up to 204 Watts of regulated DC output-power, and they are "auto-ranging" (i.e. they automatically adjust to AC input voltage, 115V or 230V nominal, with no external switch required). They will support a Power Enable (PWREN) signal allowing an external power supply to be controlled by an on/off switch on the Controller CB. The Controller CB (and the Expansion Module) has an "IEC-compatible" AC-input connector, which can be used with nationalized power cords.

The MB-BUS will be assumed to comprise a single piece, 182-contact, dual row (0.050" centers) connector. Motherboard MB has an edge connector, while card-modules 30 each have gold plated card edge-contacts. There are five MB-Bus connectors on the MB-BUS Backplanes of the Base (and Expansion) Module. Motherboard MB preferably provides the functions of: processor and memory I-O control; it may include a CPU chip and may interface to the rest of the system via S-BUS and MB-BUS.

This computer, with its basic set of modules, preferably also includes a few physical interconnects, such as a keyboard connector, the AC connector (at rear of CB), a Cluster/LAN connector, and RS232 communications connectors.

Flanking the disk drive and power supply units is an array 30 of circuit modules 31 (five pictured), each adapted for manual insertion into, and withdrawal from, an associated connector on motherboard MB, through a respective receiving slot 7B in deck 7-P.

According to a feature hereof, each circuit package 31 is "modular" and identical except for its inner contents and its end-cap 35. For instance, exemplary package 31-A houses (FIG. 3) a printed circuit board 37 connected to its motherboard-contacts and its end-cap 35, being encapsulated, in "clamp shell fashion", between a receiving plastic shell 39 and a mating plastic cover 33,—parts 33, 35, 39, being interconnected with snap means as known in the art. The other modules 31-B, 31-C, 31-D, 31-E are independent and essentially-identical outwardly (see also FIG. 6 showing the end-caps face-on and FIG. 7, a front view, showing the entire Controller CB without its outer covers, or "skins").

Figure 9:
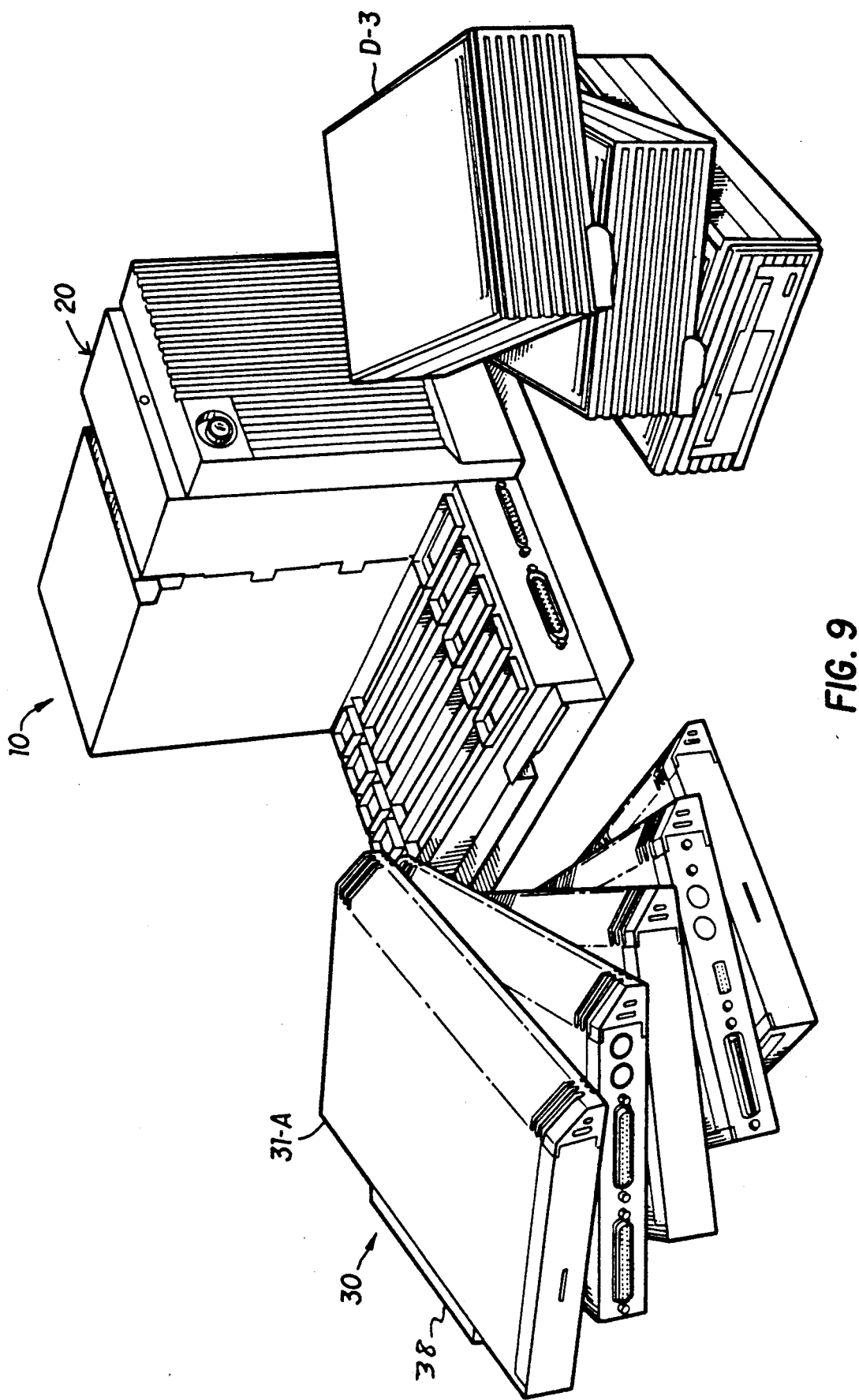

FIG. 9 is a side/rear view of Controller CB without covers. Here, note Disk drive/Unit 10 and Power Supply 20 mounted on base 7, with the three disk drives (e.g. D-3) stacked separately nearby, as are five separately stacked circuit modules (e.g. 31-A).

Figure 10:
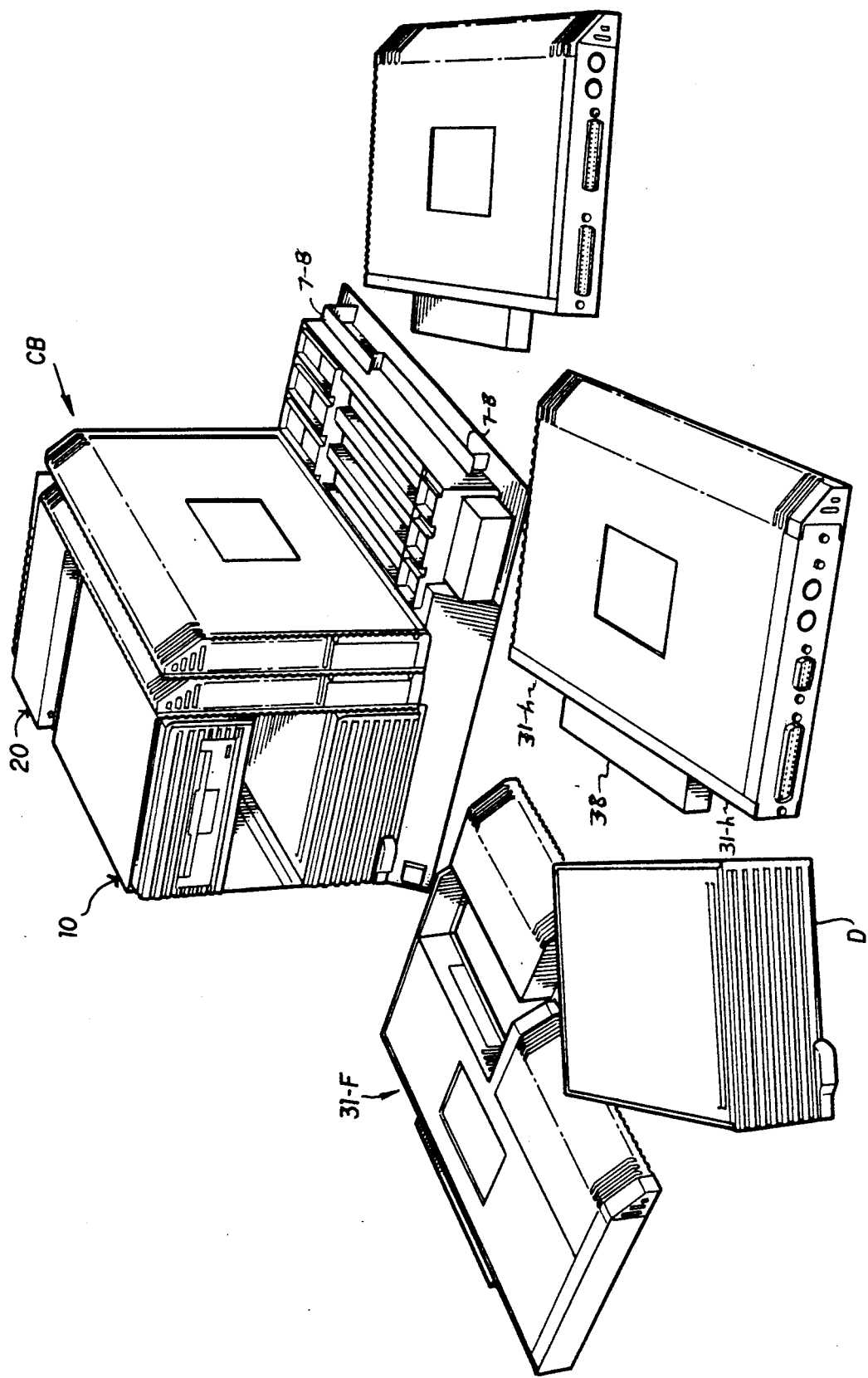
FIG. 10 is a like view but from the front, with two disk drives in-place and a few card-packages in-place.

FIG. 10 is a similar depiction (but from the front), where two disk drives have been inserted in unit 10, and two circuit modules inserted through deck 7-P.

Plenum-BASE

As mentioned, Base 7 functions as a plenum as well as to mount functional units (on deck 7-P thereof i.e. disk drive array 10, power unit 20 and circuit modules 31), while also housing bus means and motherboard MB (beneath deck 7-P. Thus, card-modules 31 may be plugged-onto MB, through deck 7-P, and may act to introduce down-flowing coolant air onto MB. Motherboard MB is preferably singular e.g. giving clock signal controls for the disk drives (via SCSI connector—e.g. a single chip with a one MB memory can be used).

Thus, Base 7 defines a plenum, or like air-capture/entrainment-cavity, through which coolant air may be drawn by fan 23. The air is first drawn-in from outside Controller CB through its skins (slits therein); thence into each Circuit-Module 31 along the top and front-side of each,—and down through the slits in each top and side, then across the circuit parts within, to cool these, to exit through the bottom apertures 31-h flanking tang 38 into the plenum and onto motherboard MB.

It will be apparent that each module 31 will be constructed and adapted to mount its circuit board therein (e.g. see exploded-module 31-A with board-37 therein, FIG. 3), so that coolant air may be drawn-in through its slits (along top bevel-edge) and through the front upper side of its shell 39, as shown, (—e.g. "air circulation in FIG. 3 proceeds from the top and upper left of the circuit board 37, and down across the board, to exit at 31-h, on both sides of the bottom tank 38; See also FIG. 10).

The connectors electrically coupling each board 37 to an associated receptacle on motherboard MB (not shown) are plated under but at the bottom each respective slot 7-B-in deck 7-P, each being flanked by coolant exit-ports engaging the plenum-top (deck 7-P in relatively air-tight relation.

Thus, the five identical "triple-slots" in deck 7-P are, each, dimensioned and positioned to receive a respective vent-hole pair and connector-tang portion 38, portion 38, being disposed and adapted to direct engagement with pin connectors on the motherboard below. The pin-connectors are arranged and positioned to automatically receive the associated edge-connectors of a respective board 37 as known in the art. Tangs 38 will be understood as self-aligning and self-guiding into these receiving slots and onto their pin connector). That is, these circuit modules 31 plug directly into the S-Bus/MB-Bus backplane.

The Base Unit motherboard, preferably, has six sections The "first" dedicated to passive S-Bus/MB-Bus signal routing: The "second" contains an IBM PS/2 compatible floppy controller and connects to the storage expansion board (T-Board). The "third" contains logic to control a PS/2-compatible, asynchronous RS232 port and a PS/2-compatible bidirectional parallel port. The "fourth" contains a speaker, used for tone generation and for audio/voice output. The "fifth" contains a PS/2-compatible Real Time Clock (RTC) and a CMOS Static RAM (8KBytes). The RTC and CMOS RAM are each provided with battery-power back-up to preserve their contents if no AC power is available. The "sixth" section contains SCSI control logic and buffering, this connecting internal storage modules to a terminal for storage devices (also see FIG. 14).

Assembly of Controller Unit

Referring to FIG. 3, it will now be evident that the functional units of Controller CB may be independently fabricated (e.g. completed at different sites, then shipped to a user-site, or to an assembly-site, where the entire Controller may be very quickly, and easily put together without specialized tools labor, etc—similarly for replacement parts). That is, once Base-plenum 7 is completed (with motherboard, etc installed), one can use this as a platform for mounting a completed disk drive array 10, a completed power unit 20 and completed circuit modules 31 (one to five).

Disk drive array 10 may be pre-assembled as a completed multi-drive unit before mounting on Base 7. With disk array 10, housed within shell 11, shell tabs can inter-lock (removably) with receiving slots in deck 7-P, as schematically indicated in FIG. 3 and as known in the art.

Thus, the pre-assembled units [disk drive, power and card modules] can easily and quickly be inserted onto the Base 7 in finished form (e.g. by the user)—a noval and significant feature.

Cover Assembly

Controller CB is now ready for application of cover assembly CC; that is the U-shaped cover CC, 4, 5 with sides; and top 3 (cf. Cut-outs CC-T on sides 5, 4 are adapted to receive respective brackets 7-B on Base 7,—when cover CC is dropped onto base 7 registering the slots with bars 7-B—then slid lockingly to the "rear", that is, in the direction of the arrow on CC, FIG. 3 as see FIG. 10).

Panel 2 will be appreciated as attached via hooks 5-H (snapped-on) or the like (no screws, etc) which are "hidden".

This enhances aesthetics and appearance, while also enhancing safety of operation. Panel 2 has an array of thru-slits, or vents, 2-5 along its top edge and upper side—these being understood as positioned and arranged to allow outside air to be drawn inward through communicating slot 5-5 in side 5, and beyond into each card module 31. (see FIGS. 5, 3).

Snap-in cover 2 fits over the MB-Bus connector on that side of Controller CB (and likewise on the Expansion Unit). The SCSI connector has a separator cover which snaps-on next to the MB-BUS cover. If the SCSI cover is removed, external SCSI devices may be attached to the exposed SCSI connector with a cable. MB-Bus SCSI parts have a built-in active terminator, which removes the termination burden from the user. Bus, when SCSI devices are hooked-up externally, external termination must still be provided.

Controller unit CB is contemplated for coupling to a related Expansion Unit by sliding the units together and installing a removable "latch plate", (via hooks 5-*h*) which is provided with the Expansion Unit. One must first remove side-cover 2, however, before attaching the Expansion Unit. Cover 2 can then be similarly attached on the right side of this Expansion Unit.

Note also that front panel 12 includes air-admitting slits, at least along the upper portion of one side. These slits oppose the tops of card-modules 31 and are adapted to admit cooling-air, this being drawn-in by the fan, in and along the upper portions (side, top) of each module 31, then down into the module itself, through the slitted bevel surfaces and adjacent upper front edge thereof. This cooling air is then drawn down across the circuit board within, and down further through its exit holes flanking tang 38, through deck 7-P, across motherboard MB to the fan (in Power supply 20, being expelled through the slits in rear screen 21).

Figure 4:
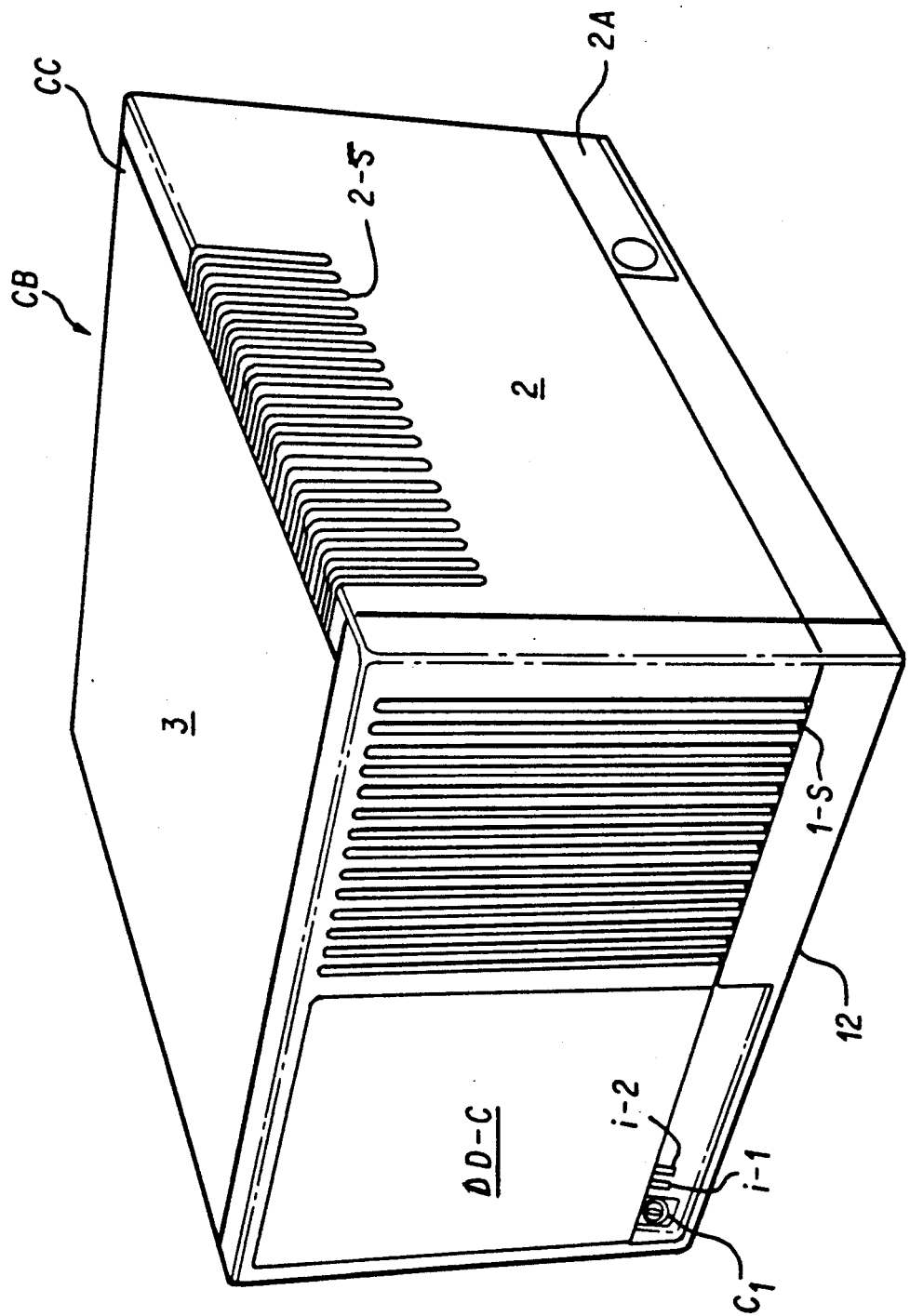
FIGS. 4 and 5 are enlarged front/side elevations of the control unit

Disk drive cover D-C may now be inserted along receiving channels (not shown) under the forward portion of cover-top 3, this cover D-C being arranged to be slidingly inserted therein for storage and, when withdrawn fully, allowed to pivot downward to cover the three disk drives-e.g. note that cover D-C is in the "removed" position in FIG. 4; (bay DD-C empty) but is "open" (retracted) in FIG. 5. Base 7 is provided with suitable indicators, such as controls on/off switch C-1 (See FIG. 4) and indicator lamps i-1, i-2, as well as "key lock" K-L, as above-noted.

Any disk drive module can be removed from the "Storage Module Bay" (in shell 11) without opening the enclosure cover as along as power is "off".

The "storage modules" (disk drives) are user-installable and are removable without the use of special tools. Each drive is mounted inside an identical plastic enclosure, with a handle to allow the drive to be easily removed from the system. Drives can be removed, when power is off, after the user issues a specific command for this, either while the system is operational, or when cover CC is removed. When power if off and one or more drives have been removed, the remaining drive(s) can be locked in place manually. Drives can only be inserted when the power if off, and are then manually locked-in. User feedback is provided to show that the storage modules are locked-in. A carrying case is provided to provide each drive once it is removed.

A protruding micro-switch M-S is disposed along the side of base 7 (FIG. 7). It is adapted to be closed when panel 2 is slid from left to right across side 5 (engaging hooks 5-*h* (FIG. 3)) with its own hooks to cover CC so that it doesn't come off when one lifts the entire unit by its cover. Micro-switch M-S will preferably protrude (behind cover 2A) and normally be in "disable" condition until panel 2 is so thrust, fully into its closed position, thereby depressing micro-switch M-S into "enable" condition (e.g. to activate the entire computer system. This is a safety feature which is preferably provided to ensure that the system cannot be operated unless the covers are in place—thus preventing insertion or removal of parts (particularly card modules 31) when the computer is "ON" or a disk drive etc is "ON".

Workers will appreciate that the system will thus not allow a card-module 31 to be inserted or removed while the system is operating. More particularly, one thus can not turn-on the system without enclosing it inside (attaching) cover CC, including panel 2. This will prevent insertion of a card during ON-time; thus, the system can not be tampered with while operating.

[Side 5 and hooks 5-h alternatively used to attach for the second, like controller box CB' (Exp. Module) as in FIG. 11; also assume similar connectors for NGEN parts as for B-1, B-2, B-3, B-4 in FIG. 12.]

Figure 11:
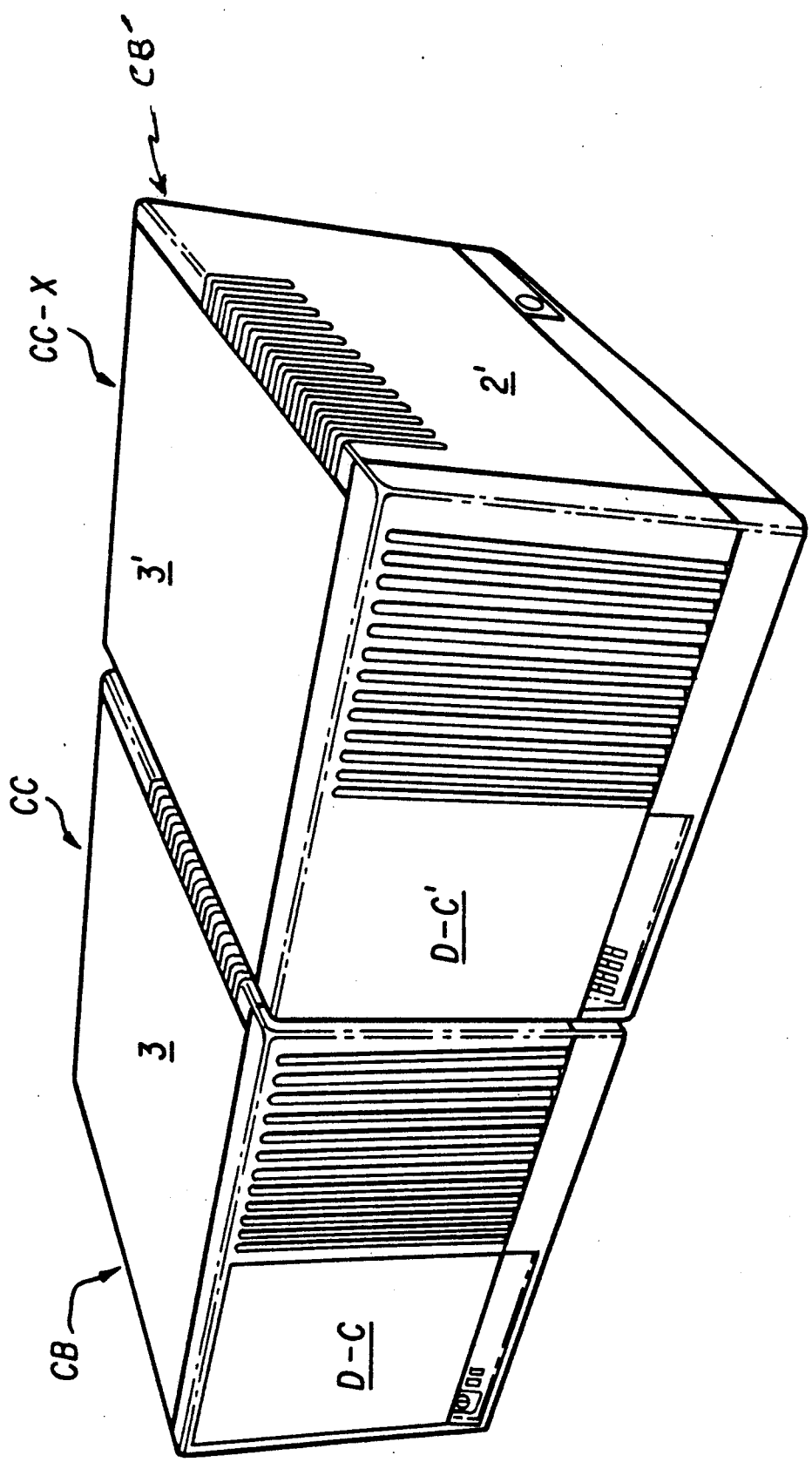
FIGS. 11, 12 are front-side perspectives of the control unit with various associated add-on modules attached.
Figure 12:
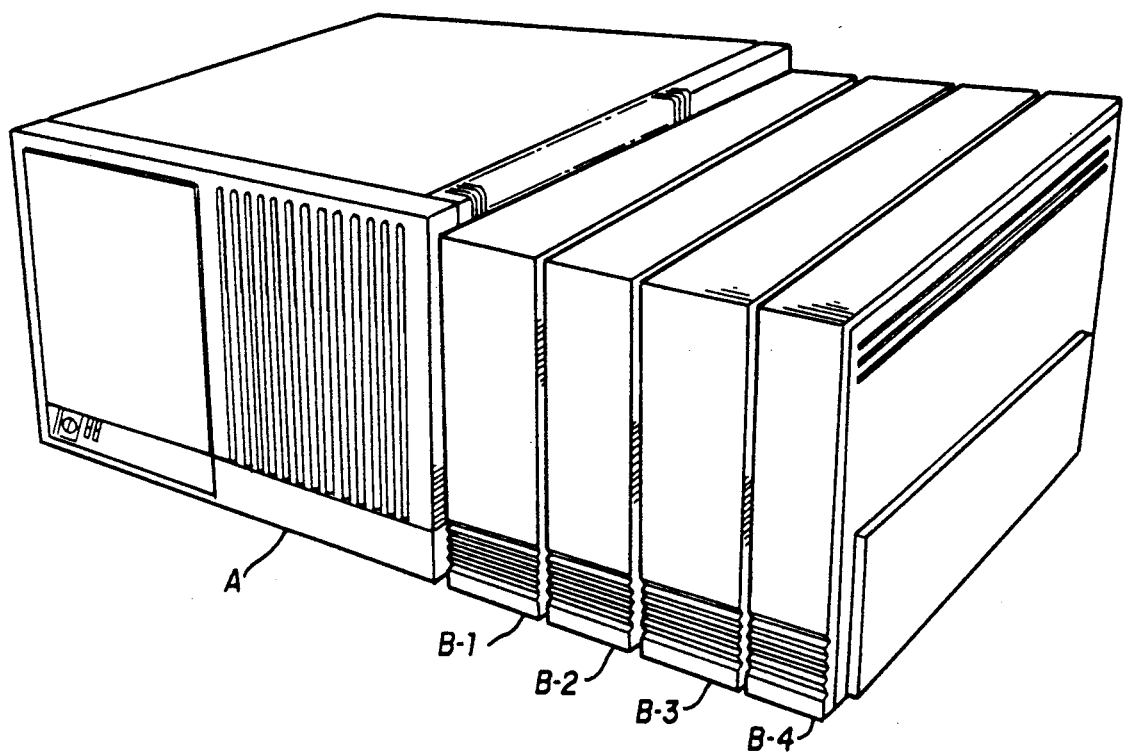

An "Expansion Controller" CB' is shown in FIG. 11 as connected to primary Controller CB. That is, primary controller CB is mechanically and electrically coupled to an essentially-identical Expansion Controller CB' (identical to Controller CB except that CB' cannot, in turn, be connected to a second Expansion Controller since this would over-extend Bus-length and thus degrade signal transmission as known in the art).

Controller CB is conventionally coupled to its Keyboard unit and to its Monitor unit (or to the keyboard via the monitor). One is free to use any compatible Monitor or keyboard with Controller CB.

Controller assembly CB thus provides complete, user-friendly, safely-handled sub-assemblies; i.e. the disk drive, power and circuit module units (as well as cover pieces). These, or replacements therefor, can be manufactured remotely from the site of assembly/use, (e.g. be shipped separately to a user in kit form, with the user doing his own final assembly and test)--yet without risk of malfunction without elaborate directions, without needed for screws or other threaded connectors, without delicate machinery or dangerous parts being damaged by handling-and involving only the plugging-in and snap-in of a few units onto a receiving plenum-base. The safe, snap-in, plastic-enclosed sub-assemblies house and protect all delicate, "untouchable" parts. Assembly can be performed in a fraction of the time required heretofore (e.g. 1/5 the usual time would be typical-)—with no internal wires to be connected, no screws, no parts to be screwed or bolted-together etc.

"Cooling Circuit"

Fan 23 (FIG. 3) will draw coolant-air in through the encapsulated circuit board modules 31 down into the plenum 7 and across motherboard MS. As a feature hereof, note the "top bevel" along each circuit module 31, allowing more entry-space (under top cover 3) for improved cooling-air access and better "finger-access".

A related feature is that circuit modules 31 may each be replaced by a dummy "Filler module" which is of identical external construction acting to isolate its respective slot in deck 7-P from the plenum and the coolant-circuit, as well as to provide electromagnetic shielding, being metallized plastic as with modules 31. (cf. "Filler module" blocks-off air flow into vacant set of holes 7-A, 7-B, 7-C, FIG. 8).

Where prior art boards typically stand free and "unencapsulated", they allow cooling-air to pass by with no particular difficulty. But encapsulated boards, boards, as here, are more apt to overheat, particularly where they have rather high component density; thus, circuit modules like 31 call for forced-air or similar cooling aid--as with our encapsulated modules.

Hence, this feature postulates an array of several modules on a plenum-deck 7-P, each module 31 having coolant air entrained therethrough, from top to bottom and out the exit holes, into the base-plenum. Thus, one must hydrodynamically couple the "draw" of pulling fan 23 to these several air-entrainment passages through cards 31 and deck. This is what the plenum 7-P in base 7 is designed to do.

In this particular embodiment, one must dissipate about 25 watts per card, yet experience no more than about 15° C. rise over ambient—quite surprisingly, this may be done with the arrangement described above using only one fan (e.g. about 30 CFM rating). This is quite surprising, especially in light of the fact that related prior art structures would be apt to use about 6 fans in such environments, even where less heat is generated.

Circuit Board Modules

Circuit board modules 31 are described above (e.g. in connection with FIGS. 3, 9, 10).

As a feature thereof, it will be apparent that they are characterized by an upper beveled edge portion (versus a conventional "square edge" configuration). This accommodates module-separation, gives a better finger-grip, and also enhances cooling as above-noted (i.e. allowing for the entrance and entrainment-circulation of coolant air along the upper card edges,—this "bevel-edge" giving extended surface-area and entraining incoming air better than a "square-top", flush against a top-cover).

Workers will recognize that a salient advantage to so-encapsulating a circuit board is that no user can touch the delicate circuit board parts and damage them, through he can still readily manipulate the board within its package. Also there is no switch or jumper apparatus to connect or disconnect.

As a related feature, the board-encapsulation is made of plastic for easier handling (e.g. slower to overheat) and it is also lightly surface-metallized (all surfaces) to proved good electromagnetic shielding (e.g. as FCC regulations- require, vs excess radiation output and as optimum computer operation calls for versus input-radiation). That is, harmful electromagnetic radiation is prevented from entering into the circuit area, e.g. from an adjacent board, from the Power supply, etc. and upsetting signals on the board). This metallized plastic shell is connected to ground via a connector on motherboard MB.

The plastic material preferably constitutes ABS, with all external surfaces being surface-metallized in a continuous thin film e.g. preferably by electro-less plating one or several thin films of (one or several) metal on the entire plastic exterior. The resultant metal shielding isolates a module electrically and also helps to isolate it thermally. The so-encapsulating PC boards may be relatively conventional; e.g. about 7 by 10 inches (59 square inches of useable area). A suitable MB-BUS Backplane board is 8 by 10.5 inches. The module boards may be four layers minimum, using fine-line trace widths and contain complete uninterrupted ground and VCC planes.

Modules 31 will be seen as attractive esthetically, being essentially identical in appearance, like books on a shelf and just as easy to handle, e.g. when inserted side-by-side on Base 7—this modularity being achieved despite differences in function and in organization of their contents.

For instance, a typical "basic" arrangement here, the "first" inserted 31-E (FIG. 3) might be a CPU circuit with 4 MB memory; while an LAN/Communications board might be in the second module 31-D (e.g. a 4 MB cluster connected with the master CP—e.g. to control a cluster of 15 to 30 work stations and or control an external peripheral such as a printer or FAX unit). A third module 31-C might contain a control circuit for video/keyboard operations. [—Connect to keyboard and to monitor, or just to monitor and thence to keyboard.] Other modules might contain "Expansion Memory" or an alternate or supplemental CP or an Expansion RAM.

Figure 13:
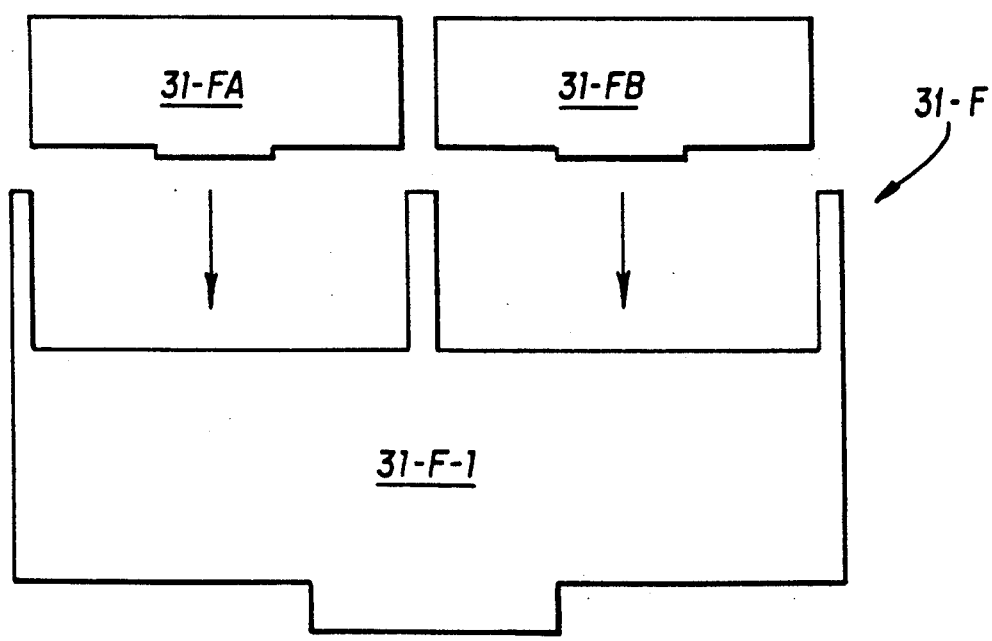
FIG. 13 is a very schematic side elevation of a particular 3-part card package embodiment.

FIGS. 10, 13 shows a "sub-modular" memory module 31-F wherein a first memory circuit board is encapsulated in a "primary" (lower) portion 31-F1; with 2 cutouts projected there-above, each adapted to receive a respective add-on, plug-in memory sub-module,— these comprising encapsulated memory sub-modules 31-FA, 31-FB, units within a "Standard Circuit Module Profile"). The insert-submodules 31-FA, -B are electrically connected to the basic module 31-F1.

For instance, the "basic portion 31-F1 may comprise 4 megabytes of DRAM and associated memory control, while the two-plug-on expansion cartridges 31-FA, 31-FB may each contain a 4 Mbyte memory expansion board—thus yielding 12 total Mbytes of DRAM for this card slot (within a single "standard module" footprint).

Workers will appreciate how easy it is to add cards e.g. to migrate-upward and increase computer power memory, yet keep the same modular configurations of encapsulated boards.

Exemplary Electronics

Figure 14:
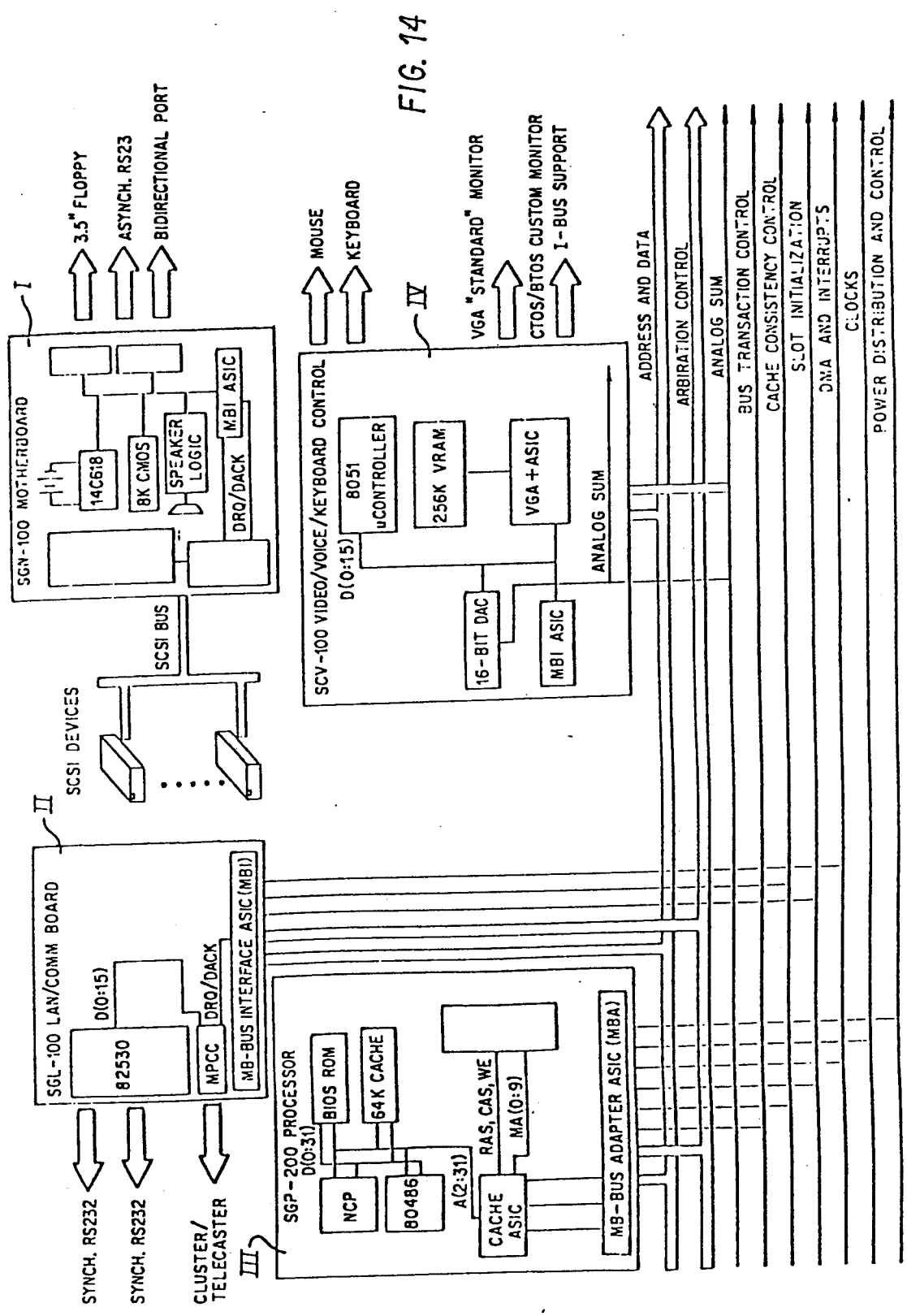
FIG. 14 is a schematic Block Diagram showing how such an embodiment can be interconnected, in itself, and with related devices.

For instance, FIG. 14 shows a functional diagram, simplified and schematic, for an exemplary, preferred motherboard/daughterboard combination. Here, Motherboard I will be seen as controlling SCSl devices and related peripherals, while three daughter-board units (II LAN/COMM, III Processor and IV Video/Voice/Keyboard control), are coupled to associated portions of a common MBBUS/S-BUS array.

Conclusion

It will be understood that the preferred embodiments described herein are only exemplary, and that the invention is capable of many modifications and variations in constructions, arrangement and use without departing from the spirit of what is claimed.

Further modifications of the invention are also possible. For example, the means and methods disclosed herein are also somewhat applicable to other related computer units. Also, the present invention is applicable with like modules, along or together, for other like systems.

The above examples of possible variations of the present invention are merely illustrative. Accordingly, the present invention is to be considered as including all possible modifications and variations coming within the scope of the invention as defined by the appended claims.

What is claimed is:

1. A control unit for a desktop control system, said unit including a base means; fan means; motherboard means mounted on said base means; and a plurality of daughterboard means, each packaged in a like envelope means and including connector means removably coupled on the motherboard means;

said base means being characterized by deck means superposed above the motherboard means forming plenum space thereabove; the deck means having plural slot means by which said motherboard said plurality daughterboard means removably coupled to said motherboard means; the deck means also including like vent-hole means flanking each said slot means;

each said daughterboard envelope means including intake-vent means and exhaust-hole means arranged in registry with said deck vent-holes;

said fan means pulling cooling air into each envelope means co-coupled on the motherboard means, then out the respective exhaust-hole means, down onto the motherboard means, and thereacross.

2. The invention of claim 1 wherein each said daughterboard envelope means is essentially identical and includes upper vent means for entry of cooling air and lower vent means for exit thereof onto said motherboard means; and wherein each said set of aperture means includes air-holes through said deck means and disposed to register with respective lower vent means.

3. The invention of claim 2 wherein said unit also includes removable cover means attachable to the platform means about said envelopes and platform means; being disposed relatively close to the tops of the envelopes and vented to admit cooling air thereto.

4. The invention of claim 3 wherein said lower vent means in each envelope are arranged and adapted to interfit with registering aperture means thru said deck means in virtual air-tight relation therewith.

5. The invention of claim 2 wherein each said envelope includes a self-locating tang portion disposed and configured to be removably and guide-ingly registered-into any respective one of each set of aperture means.

6. The invention of claim 5 wherein a cover means is disposed relatively close to the tops of all envelopes so mounted on the deck means; and wherein these top-edges are all vented and tilted oblique to their sides in like fashion.

7. The invention of claim 6 wherein said top-edges of the envelopes and adjacent upper envelope surfaces are vented to admit cooling air; and wherein the cover means is likewise vented.

8. The invention of claim 3 wherein at least one of said envelopes is dummy-envelope which is outwardly-identical with the other envelopes, except that its vent means are blocked-off.

9. The invention of claim 2 wherein said fan means is also arranged and disposed to, finally, cool transformer means adjacent thereto.

10. The invention of claim 9 wherein said unit also includes removable cover means attachable to the platform means about said envelopes and platform means; being disposed relatively close to the tops of the envelopes and vented to admit cooling air thereto.

11. The invention of claim 10 wherein each said envelope includes a self-locating tang portion disposed and configured to be removably and guide-ingly registered-into any respective one of each set of aperture means; wherein a cover means is disposed relatively close to the tops of all envelopes so mounted on the deck means; and wherein these top-edges area all vented and tilted oblique to their sides in like fashion.

12. A computer control unit comprising:

planar base means;

motherboard means disposed on said base means, and including N like connector-receiving means;

deck means, mounted on said base means and extending above said motherboard thereby forming a plenum-space and receiving N like substantially rectangular circuit board envelope means, each said envelope means including circuit-board connector means removeably connected with respective said connecter-receiving means;

said deck means including N like sets of aperture means, each set comprising a connect-hold removably receiving said connector means and at least one air-hole passing coolant-air from one of said envelope means down onto said motherboard means;

at least two of said circuit board envelope means, each including air-intake vent means, each containing a circuit board with said connector means protruding from the rectangular profile of its surrounding envelope means and inserted through a said connect-hole and connected with a said connector-receiving means on said motherboard each envelope also including air-vent means at least one of which interfits with said at least one air-hole; and draft means pulling ambient air into the envelope means, then down onto said motherboard means.

13. In a desktop computer arrangement including motherboard means having a plurality of connect-means, and a plurality of electronic modules, each such module comprising at least one circuit means with connector-means adapted for interconnection with one of said connect-means plus modular envelopes means enclosing said associated circuit means, the combination therewith of:

deck means superposed over said motherboard means and spaced therefrom to form a plenum space thereabove;

said deck means being characterized by a plurality of like aperture-sets, each said set comprising a connect-slot disposed in registry above a respective one of said connect-means plus one or more air-slots flanking said connect-slot;

each said modular envelope means including a like set of apertures formed and disposed to register with said aperture-sets, each said aperture set consisting of a connect-skirt about said respective circuit connector means, said skirt being formed for insertion snugly into a said connect-slot, plus one or more air-holes, each said air-hole being formed and disposed for registry with a respective one of said air-slots;

each said modular envelope means also including air-admitting vent means whereby cooling air may be drawn into each said envelope means, and thereacross coolingly, to exit through said air holes, being then directed coolingly across selected portions of said motherboard means.

* * * * *